(12) United States Patent
Matuszewski (10) Patent No.: US 8,819,199 B2
(45) Date of Patent: Aug. 26, 2014

(54) METHOD, APPARATUS, AND COMPUTER PROGRAM PRODUCT FOR PROVIDING A SMOOTH TRANSITION BETWEEN PEER-TO-PEER NODE TYPES

(75) Inventor: Marcin Matuszewski, Warsaw (PL)

(73) Assignee: Nokia Corporation, Espoo (FI)

( * ) Notice: Subject to any disclaimer, the term of this patent is extended or adjusted under 35 U.S.C. 154(b) by 447 days.

(21) Appl. No.: 12/746,671

(22) PCT Filed: Nov. 24, 2008

(86) PCT No.: PCT/IB2008/003198
§ 371 (c)(1),
(2), (4) Date: Nov. 9, 2010

(87) PCT Pub. No.: WO2009/071971
PCT Pub. Date: Jun. 11, 2009

(65) Prior Publication Data
US 2011/0173305 A1    Jul. 14, 2011

Related U.S. Application Data

(60) Provisional application No. 60/992,600, filed on Dec. 5, 2007.

(51) Int. Cl.
*G06F 15/16* (2006.01)
*G06F 15/177* (2006.01)

(52) U.S. Cl.
USPC .......................... 709/221; 709/218; 709/220

(58) Field of Classification Search
USPC ......... 709/203, 209, 217, 223, 238, 218, 220, 709/221
See application file for complete search history.

(56) References Cited

U.S. PATENT DOCUMENTS

| | | | |
|---|---|---|---|
| 7,788,522 B1* | 8/2010 | Abdelaziz et al. | 709/209 |
| 8,024,477 B2* | 9/2011 | Rothman et al. | 709/238 |
| 2002/0147815 A1 | 10/2002 | Tormasov et al. | |
| 2003/0002441 A1 | 1/2003 | Banerjee et al. | |
| 2004/0064568 A1 | 4/2004 | Arora et al. | |
| 2006/0215576 A1 | 9/2006 | Yu et al. | |
| 2007/0005744 A1* | 1/2007 | Rothman et al. | 709/223 |
| 2010/0103829 A1* | 4/2010 | Murzeau et al. | 370/252 |

FOREIGN PATENT DOCUMENTS

WO    2006/134562 A    12/2006

OTHER PUBLICATIONS

Handley, RFC2327—SDP: Session Description Protocol, Apr. 1998, Network Working Group.
United States Official Action for U.S. Appl. No. 11/937,666 dated Jun. 9, 2010, pp. 1-25.
International Search Report and Written Opinion of the International Searching Authority for PCT/IB2008/003198 dated Nov. 13, 2009, pp. 1-18.

(Continued)

*Primary Examiner* — Quang N Nguyen
(74) *Attorney, Agent, or Firm* — Mintz, Levin, Cohn, Ferris, Glovsky & Popeo, P.C.

(57) ABSTRACT

An apparatus for providing data management in a P2P network may include a processor. The processor may be configured to identify resources and communicate information to another node(s). The information may include a request to change the apparatus from a first mode of operation to a second mode of operation based on the identified resources.

20 Claims, 5 Drawing Sheets

(56) References Cited

OTHER PUBLICATIONS

Baset et al., "Peer-to-Peer Protocol (P2PP) draft-baset-p2psip-p2pp-01", Network Working Group, Internet-Draft, Standards Track, IETF Trust, Nov. 19, 2007, pp. 1-96.

Pascual Avila et al., "P2PSIP Clients draft-pascual-p2psip-clients-00", P2PSIP WG, Internet-Draft, Informational, IETF Trust, Dec. 4, 2007, pp. 1-12.

Rhea et al., "Handling Churn in a DHT", USENIX Association, Proceedings of the General Track: 2004 USENIX Annual Technical Conference, Boston, MA, Jun. 27-Jul. 2, 2004, pp. 1-16.

CSpace, "Secure, Decentralized, user-to-user communication", Tachyon Teamtalk, http://cspace.in/. pp. 1-3.

Cooper, et al., "NAT Traversal for dSIP draft-matthews-p2psip-dsip-nat-traversal-00", P2PSIP Working Group, Internet Draft, Standards Track, IETF Trust, Feb. 25, 2007, pp. 1-23.

International Search Report and Written Opinion of the International Searching Authority for PCT/IB2008/054676, dated Sep. 4, 2009, pp. 1-13.

Gurbani et al., "Cryptographically Transparent Session Initiation Protocol (SIP) Proxies", Communications, 2007, ICC '07, IEEE International Conference on IEEE, PI, Jun. 1, 2007, pp. 1185-1190.

Shim et al., "An Architecture for Peer-to-Peer Session Initiation Protocol (P2P SIP) draft-shim-sipping-p2p-arch-00", IETF Standard Working Draft, Internet Engineering Task Force, IETF, Feb. 26, 2006, pp. 1-30.

Tati et al., "ShortCuts: Using Soft State To Improve DHT Routing", Department of Computer Science and Engineering, University of California, San Diego, 2004, pp. 1-18.

\* cited by examiner

ion sharing in P2P networks. A P2P network is generally considered a network that relies primarily on the computing power and bandwidth of the devices (i.e., peers) within the network. Accordingly, P2P networks generally do not concentrate computing power and bandwidth within servers. Instead, each of the peer devices is capable of simultaneously functioning as both a client and a server to other nodes of the P2P network. In this regard, when the peer device functions as client the device is able to request data from other peer devices in the P2P network and store this data once received from another peer device. On the other hand, when the peer device operates as a server, the peer device is able to accept requests from other peer devices, process them and send the requested data to the peer devices in the P2P network. The architecture of P2P networks typically involves connecting nodes via largely ad hoc connections over which participant nodes can, for example, share content files containing audio, video, data or virtually anything in a digital format. Accordingly, data such as real time data or telephony traffic could be shared using a P2P network.

METHOD, APPARATUS, AND COMPUTER PROGRAM PRODUCT FOR PROVIDING A SMOOTH TRANSITION BETWEEN PEER-TO-PEER NODE TYPES

RELATED APPLICATION

This application was originally filed as PCT Application No. PCT/IB2008/003198 filed Nov. 24, 2008, which claims priority to United States Provisional Patent Application Number 60/992,600, filed on Dec. 5, 2007.

TECHNOLOGICAL FIELD

In general, embodiments of the present invention relate to data communications networks and, more particularly, relate to a method, apparatus and computer program product for facilitating data management in a peer-to-peer (P2P) network.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to provision of informat Given the ubiquitous nature of mobile terminals, such as mobile phones and numerous other mobile electronic devices, P2P networks are becoming more common for sharing content between individuals in social groups or social networks. These social networks may center on a group of friends, relatives, co-workers, business associates, or people who share a common interest. Each individual (i.e., node) within a social network may invite other individuals to join. As such, although any particular node may generally communicate with a given group of other nodes within the social network, each of the other nodes may subsequently communicate with yet other nodes. Accordingly, within a social network, each node may be defined in terms of a degree of separation from each other node.

P2P networks can provide a mechanism for storing different types of data in a distributed way. In this regard, a distributed hash table (DHT) may define a structured overlay network architecture. A DHT architecture may be enabled to locate a particular piece of data stored in the overlay network using a limited number of messages, typically log(N) messages (N being a number of nodes in the network). Nodes of the overlay network are called peers, and each peer may have a unique peer ID (or node ID), which may be assigned when the peer joins the DHT. The DHT may be organized in a ring topology. Accordingly, the hash table's keyspace may be thought of as circular and peer IDs may be 128-bit unsigned integers representing position in the circular keyspace. Peer IDs are typically created by hashing the Internet Protocol (IP) address of the peer device. Thus, if the IP address of the peer changes, the peer ID also changes.

Additionally, each peer may maintain a routing table (e.g., a finger table) that may be used to route messages to a designated destination. The routing (or finger) table may include a list of peers and the corresponding IP address of each of the peers (and/or other connectivity information) in the overlay network. In some embodiments, the number of peers in the list may be much smaller than the number of peers in the overlay. The routing table may therefore represent a collection of shortcuts to move throughout the DHT ring to reduce the number of hops needed to locate a particular resource in the network. Additionally, the shortcuts in the routing table could include pointers to peers in the DHT ring or pointers to devices that are external to the DHT ring. Resources stored in the DHT may be indexed using corresponding data IDs, in which data IDs are distributed among DHT nodes. Each DHT node may store a subset of data IDs. One of the focuses of using the DHT involves changes in the set of participants in the P2P network causing a minimal amount of disruption. For instance, usage of the DHT is intended to limit the amount of work needed to be done for each change in membership of the peer devices in the P2P network. Generally this allows DHTs to scale to extremely large numbers of peer devices and to handle continual node arrivals, departures and failures in the P2P network.

One problem that is common among P2P networks relates to the transition of a device from a peer mode to a client mode as well as the transition from the client mode back to a peer mode increases the disruption to the DHT which typically is updated when the peer device changes its functionality from a client to a peer and vice versa. Increases in the disruption of the DHT may lead to problems associated with load balance, routing and data storage and quick retrieval of data by the peers in the P2P network.

As such, it may be beneficial to provide a mechanism for improving the transition of a peer device to a client functionality as well as the transition from the client functionality of the peer device to a server functionality with a minimal impact on a distributed hash table (DHT).

BRIEF SUMMARY

Exemplary embodiments of the invention are therefore provided for facilitating data management in a P2P network and facilitating a mechanism for simplifying transitions of the nodes (i.e., peer devices) in the P2P network from a peer mode to a client mode (or alternatively from a client mode to a peer mode) based on the resources of the nodes or resources of the P2P network which reduces the impact on the DHT thereby conserving resources in the P2P network. For instance, when a peer device determines that its resources are limited (e.g., battery power is diminished, processing/memory constraints) or that the resources of the P2P network are limited (e.g., bandwidth), the peer device may transition from operating in a peer mode to a client mode, which typically requires less resources than operation in peer mode given that the peer device generally has more capabilities and functionalities when it is operating in the peer mode as opposed to the client mode. For example, in the peer mode the peer device may maintain the overlay network and route messages in the overlay network.

In an exemplary embodiment, the peer(s) seeking to change its status to a peer mode or client mode (or vice versa) may not do so when the DHT is currently in a transition state and instead may wait until after the transition state of the DHT has ended in order to change the status of the peer. In this regard, exemplary embodiments of the present invention decrease the impact of the changes to the DHT at a given time which serves to increase the load balance, bandwidth and data retrieval mechanisms of the P2P network. As such, content sharing platforms may prefer embodiments of the present invention for usage in environments capable of handling extremely large numbers of nodes and to handle continual node arrivals, departures and possible failures.

It should be pointed out that embodiments of the present invention may be employed, for example, in mobile terminals or other nodes in order to provide improved content sharing capabilities between nodes in a P2P network and improved transitions between modes of operation of the nodes such as for example between a client mode and/or a peer mode of operation, thereby causing less impact to the DHT when these transitions occur.

In one exemplary embodiment, a method of providing data management in a P2P network is provided. The method may include identifying resources of an originating node and communicating, from the originating node, information to at least another node(s). The information may include a request to change a mode of operation of the originating node from a first mode of operation to a second mode of operation based on the resources identified.

In another exemplary embodiment, a computer program product for providing data management in a P2P network is provided. The computer program product may include at least one computer-readable storage medium having computer-readable program code portions stored therein. The computer-readable program code portions may include first and second executable portions. The first executable portion is for identifying resources of an originating node. The second executable portion is for communicating, from the originating node, information to at least another node(s). The information may include a request to change a mode of operation of the originating node from a first mode of operation to a second mode of operation based on the resources identified.

In another exemplary embodiment, an apparatus for providing data management in a P2P network is provided. The apparatus may include a processor configured to identify resources and communicate information to at least one node(s). The information may include a request to change a mode of operation of the apparatus from a first mode of operation to a second mode of operation based on the resources identified.

In yet another exemplary embodiment, an apparatus for providing data management in a P2P network is provided. The apparatus may include a processor configured to receive a request from an originating node to change a mode of operation of the originating node from a first mode of operation to a second mode of operation based on identified resources of the originating node. The processor may also be configured to determine whether a distributed hash table is in a transition state and may send, in response to the request, the originating node information indicating whether the originating node is allowed to change from the first mode to the second mode based on the determined transition state.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
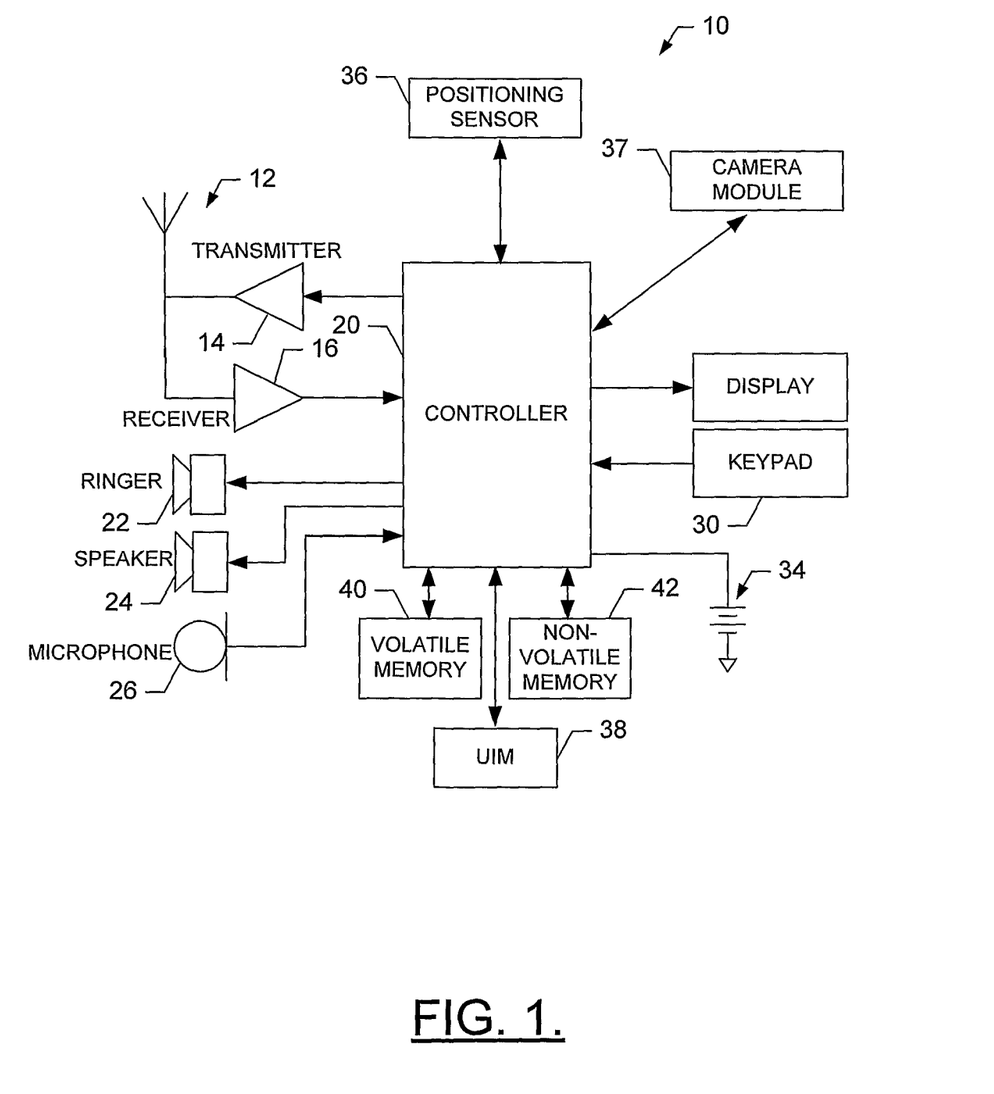
FIG. 1 is a schematic block diagram of a mobile terminal according to an exemplary embodiment of the present invention.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. In particular, not all apparatuses that employ embodiments of the present invention may comprise all the features illustrated. While several embodiments of the mobile terminal 10 may be illustrated and hereinafter described for purposes of example, other types of mobile terminals, such as portable digital assistants (PDAs), pagers, mobile televisions, gaming devices, laptop computers, cameras, video recorders, audio/video player, radio, GPS devices, or any combination of the aforementioned, and other types of voice and text communications systems, can readily employ embodiments of the present invention. Furthermore, devices that are not mobile may also readily employ embodiments of the present invention.

In addition, while several embodiments of the method of the present invention are performed or used by a mobile terminal 10, the method may be employed by other than a mobile terminal. Moreover, the system and method of embodiments of the present invention will be primarily described in conjunction with mobile communications applications. It should be understood, however, that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 may further include an apparatus, such as a controller 20 or other processing element, (hereinafter referred to as either a processor or controller) that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks described below in connection with FIG. 2.

It is understood that the apparatus, such as the controller 20, may include circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output. In addition, the mobile terminal 10 may include a positioning sensor 36. The positioning sensor 36 may include, for example, a global positioning system (GPS) sensor, an assisted global positioning system (Assisted-GPS) sensor, etc. The positioning sensor 36 may also include a pedometer or inertial sensor. In this regard, the positioning sensor 36 is capable of determining a location of the mobile terminal 10, such as, for example, longitudinal and latitudinal directions of the mobile terminal 10, or a position relative to a reference point such as a destination or start point. Information from the positioning sensor 36 may then be communicated to a memory of the mobile terminal 10 or to another memory device to be stored as a position history or location information.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which determines an identity of the current cell, i.e., cell id identity or cell id information, with which the mobile terminal 10 is in communication. In conjunction with the positioning sensor 36, the cell id information may be used to more accurately determine a location of the mobile terminal 10.

The mobile terminal 10 may include a media capturing module, such as a camera, video and/or audio module, in communication with the controller 20. The media capturing module may be any means for capturing an image, video and/or audio or any other suitable digital media for storage, display or transmission. For example, in an exemplary embodiment in which the media capturing module is a camera module 37, the camera module 37 may include a digital camera capable of forming a digital image file from a captured image, or a video file from a series of captured image frames with or without accompanying audio data. As such, the camera module 37 includes all hardware, such as a lens or other optical device, and software necessary for creating a digital image, video or audio file from captured image/audio data. Alternatively, the camera module 37 may include only the hardware needed to capture an image, while a memory device of the mobile terminal 10 stores instructions for execution by the controller 20 in the form of software necessary to create a digital image file from a captured image. In an exemplary embodiment, the camera module 37 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard or other format.

Figure 2:
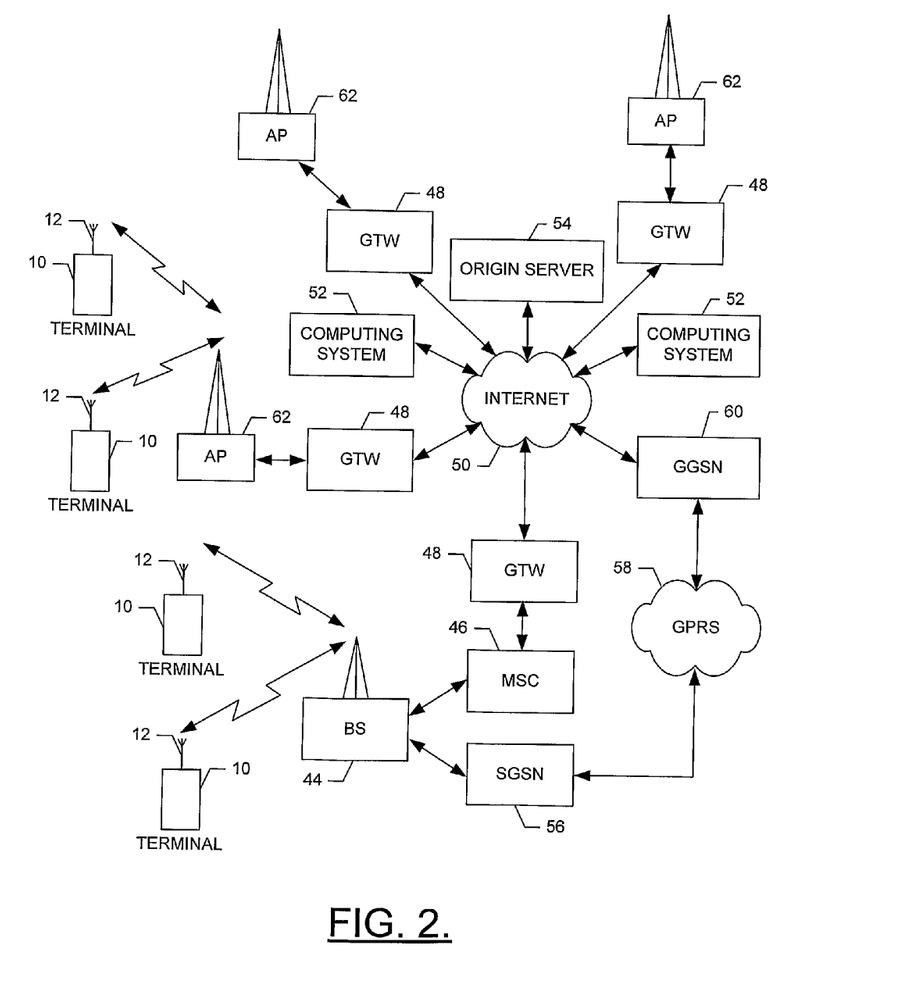
FIG. 2 is a schematic block diagram of a wireless communications system according to an exemplary embodiment of the present invention.

FIG. 2 is a schematic block diagram of a wireless communications system according to an exemplary embodiment of the present invention. Not all embodiments of the invention make use of systems comprising all the features illustrated. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. The MSC 46 may also be coupled to a gateway device (GTW) 48, and the GTW 48 can be coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a serving GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a gateway GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (VAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, BlueTooth (BT), ultra wideband (UWB) and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX, UWB techniques and/or the like. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

Content or data may be communicated over the system of FIG. 2 between a mobile terminal, which may be similar to the mobile terminal 10 of FIG. 1, and a network device of the system of FIG. 2 in order to, for example, execute applications or establish communication (for example, for purposes of content sharing) between the mobile terminal 10 and other mobile terminals. As such, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, and/or may be resident on a camera, server, personal computer or other device, absent any communication with the system of FIG. 2.

As mentioned above, P2P networks may be formed via ad hoc connections between various nodes, which could be mobile terminals such as mobile terminal 10. Such connections may then be utilized to, for example, share access to content which could include video clips, text, audio data, photographs, etc. It should also be understood that accessing content could refer to accessing resources of a particular device. A common way to control access to content has been to provide access control lists (ACLs), which inform a particular device which permissions or access rights each user or group has to specific objects such as files or directories. The access control may be based on the identity of a corresponding user (e.g., username, user ID, etc) or the identity of a device (e.g., device name, media access control (MAC) address, Internet Protocol (IP) address, etc.). By utilizing relationships in P2P networks, other ways of controlling access to content may be implemented.

An exemplary embodiment of the invention will now be described with reference to FIG. 3, in which certain elements of an apparatus for enabling the provision of secure data management in a P2P network are displayed. The apparatus of FIG. 3 may be embodied as or otherwise employed, for example, on a device such as the mobile terminal of FIG. 1. However, it should be noted that the apparatus of FIG. 3, may also be employed on a variety of other devices, both mobile and fixed, and therefore, embodiments of the present invention should not be limited to application on devices such as mobile terminals. It should also be noted that while FIG. 3 illustrates one example of a configuration of an apparatus for enabling the provision of secure data management in a P2P network, numerous other configurations may also be used to implement embodiments of the present invention.

Figure 3:
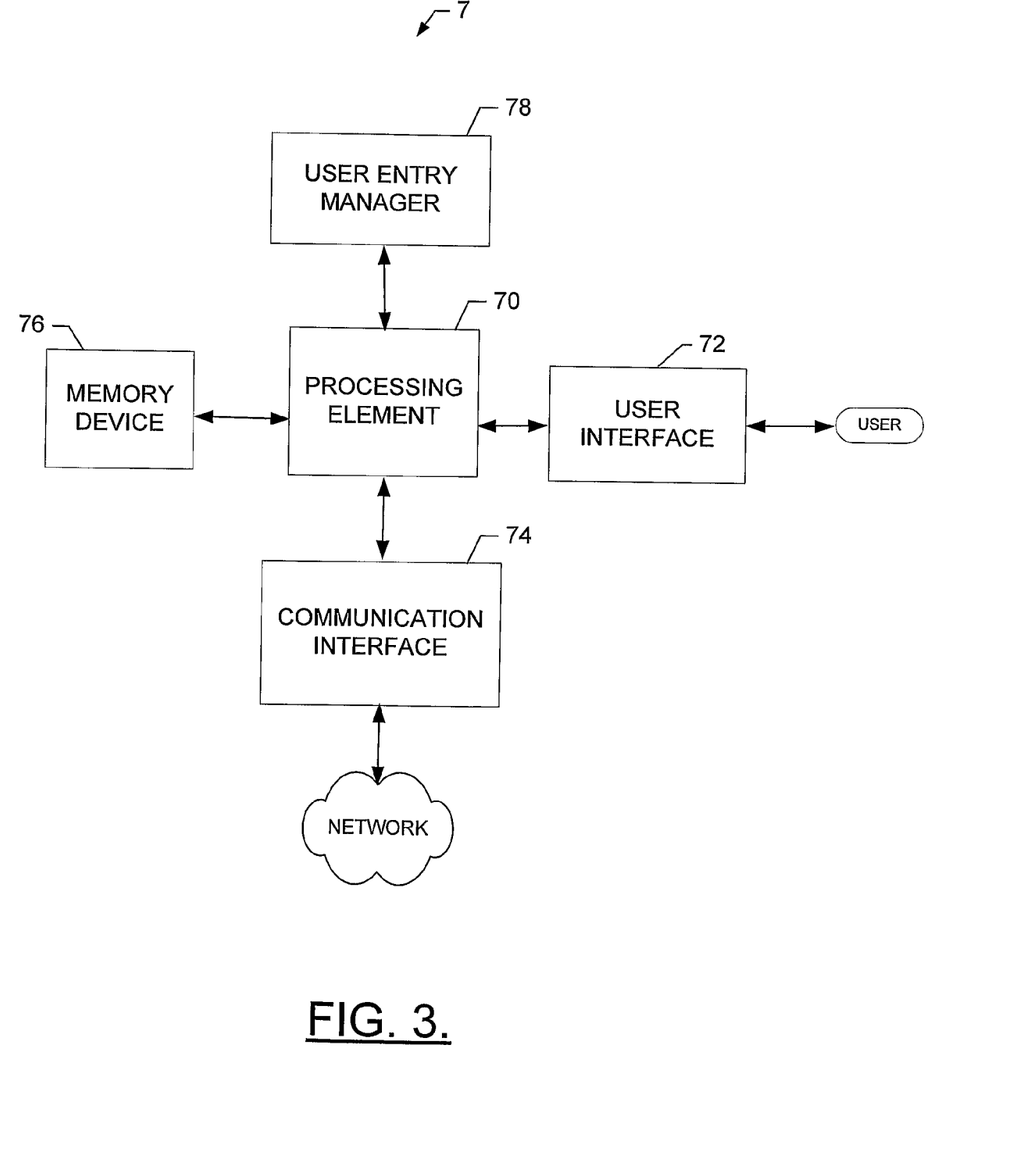
FIG. 3 is a block diagram of an apparatus for providing data management in a P2P network according to an exemplary embodiment of the present invention.

Referring now to FIG. 3, an apparatus for enabling the provision of data management in a P2P network is provided. The apparatus 7 may include or otherwise be in communication with a processing element 70 (e.g., controller 20), a user interface 72, a communication interface 74 and a memory device 76. The memory device 76 may include, for example, volatile and/or non-volatile memory (e.g., volatile memory 40 and/or non-volatile memory 42). The memory device 76 may be configured to store information, data, applications, instructions or the like for enabling the apparatus to carry out various functions in accordance with exemplary embodiments of the present invention. For example, the memory device 76 could be configured to buffer input data for processing by the processing element 70. Additionally or alternatively, the memory device 76 could be configured to store instructions for execution by the processing element 70. As yet another alternative, the memory device 76 may be one of a plurality of databases that store information and/or media content.

The processing element 70 may be embodied in a number of different ways. For example, the processing element 70 may be embodied as a processor, a coprocessor, a controller or various other processing means or devices including integrated circuits such as, for example, an ASIC (application specific integrated circuit) or FPGA (field-programmable gate array) or combinations thereof. The processing element 70 may be configured to execute instructions stored in the memory device 76 or otherwise accessible to the processing element 70. Meanwhile, the communication interface 74 may be embodied as any device or means embodied in either hardware, software, or a combination of hardware and software that is configured to receive and/or transmit data from/to a network and/or any other device or module in communication with the apparatus. In this regard, the communication interface 74 may include, for example, an antenna and supporting hardware and/or software for enabling communications with a wireless communication network.

The user interface 72 may be in communication with the processing element 70 to receive an indication of a user input at the user interface 72 and/or to provide an audible, visual, mechanical or other output to the user. As such, the user interface 72 may include, for example, a keyboard, a mouse, a joystick, a touch screen display, a conventional display, a microphone, a speaker, or other input/output mechanisms. In an exemplary embodiment in which the apparatus is embodied as a server, the user interface 72 may be limited, or eliminated. However, in an embodiment in which the apparatus is embodied as a mobile terminal (e.g., the mobile terminal 10), the user interface 72 may include, among other devices or elements, any or all of the speaker 24, the ringer 22, the microphone 26, the display 28, and the keyboard 30.

In an exemplary embodiment, the processing element 70 may be embodied as or otherwise control a user entry manager 78. The user entry manager 78 may be any means such as a device or circuitry embodied in hardware, software or a combination of hardware and software that is configured to perform the corresponding functions of the user entry manager 78. In this regard, a user entry may include, for example, user contact information and/or files, data or content the user would like to share with others. As such, the user entry manager 78 may be configured to enable the user (or the device associated with the user) to make information included in the user entry available to other users (e.g., nodes or peers) in a P2P network. Since the P2P network is a distributed network, making information available to others may involve updating a user entry by sending information to be shared from an originating node to a destination node where the information will be stored.

In a typical P2P network employing a DHT, PUT and GET messages may be used in the context of resource distribution. For example, a PUT message may be used to make a particular resource (e.g., content or information) available to others. Meanwhile, a GET message may be a request for a representation of a specified resource (e.g., a request for content or information made available for sharing). As such, PUT operations may insert information into a P2P overlay for sharing with others, while GET operations may enable retrieval of information previously made available via a PUT operation from a P2P network overlay. According to embodiments of the present invention, the user entry manager 78 may be configured to enable the generation of PUT and/or GET messages to provide a P2P node, such as the mobile terminal 10, to perform PUT and/or GET operations in accordance with embodiments of the present invention, one exemplary description of which is provided below. In this regard, the apparatus of FIG. 3 as well as the mobile terminal 10 may operate as peer devices having both functionality as a client and a server. In an exemplary embodiment, the peer devices (e.g., the apparatus 7 and the mobile terminal 10) of the exemplary embodiments of the present invention may each have a client mode and a peer mode of operation. It should be pointed out that the peer mode of operation enables the peer device(s) to function as a server. For example, in the peer mode the apparatus 7 and/or the mobile terminal 10 may receive requests for data from one or more other peer devices or devices functioning as clients and upon receiving these requests may process them and send the requested data to the requesting devices or forward the request(s) to another peer device(s) in order to retrieve the requested data. Once retrieved the requested data may be sent to the requesting device, by the peer operating in the peer mode, which may pass through one or more intermediate nodes (i.e., peers) in route to the requesting device. Additionally, in the peer mode the apparatus 7 and/or mobile terminal 10 may maintain the overlay network and route messages in the overlay network. In the client mode of operation, the peer device(s) (e.g., apparatus 7 and/or mobile terminal 10) may send data requests to other peer devices and receive the data from these other peer devices which may be sent via one or more intermediate nodes. Additionally, in the client mode of operation the peer device(s) is capable of sending data stored in its memory to another peer device(s) and this peer device, if it is operating in the peer mode may forward the data on to one or more other peer devices. In large part, the client mode and the peer mode have many of the same capabilities with an exception being that in the client mode the apparatus 7 and/or mobile terminal 10 does not maintain the overlay network. Rather, the maintaining of the overlay network is performed in the peer mode as discussed above.

Furthermore, in the context of intermediate nodes, nodes storing information, and/or nodes ultimately requesting information, the user entry manager 78 of these nodes may further be configured to enable the nodes to forward PUT and/or GET messages and execute PUT and/or GET operations themselves. The user may utilize the user interface 76 to provide input to the user entry manager 78 with respect to identifying content or information for inclusion in a user entry and thereafter for selecting PUT and/or GET operations.

Figure 4:
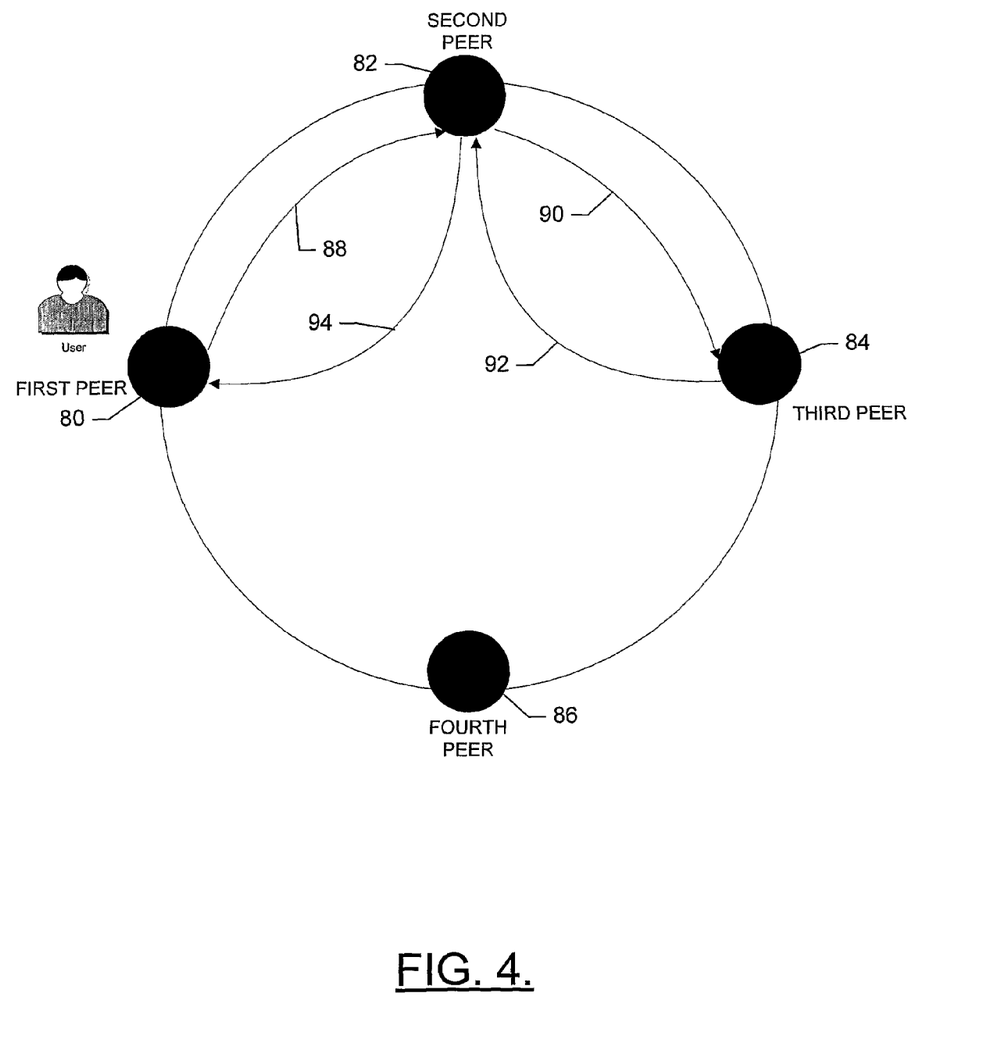
FIG. 4 illustrates an example of a ring topology of a P2P network utilizing DHT in which a peer device may switch between a client mode and peer mode of operation according to an exemplary embodiment of the present invention.

FIG. 4 illustrates an example of a ring topology of a P2P network utilizing DHT (e.g., a DHT network, distributed hash table network) in which a peer device may switch between a client mode and peer mode of operation according to an exemplary embodiment of the present invention. Although the P2P network of FIG. 4 may be supported by various network architectures, the P2P of FIG. 4 may be supported by the wireless communication system of FIG. 2 in one embodiment. As shown in FIG. 4, a user may be associated with first node or peer 80. Other nodes including a second peer 82, a third peer 84 and a fourth peer 86 may also be included in the ring topology. It should be noted that FIG. 4 only shows a four peer DHT network, but more or less nodes could be included in a network operating in accordance with embodiments of the present invention. In fact, in some instances hundreds, thousands or even millions of nodes may be included in the DHT network. Accordingly, in larger networks, the number of nodes forwarding GET responses and/or PUT requests may be significantly larger, resulting in large amounts of data that may be transferred. However, although an embodiment of the present invention is described below in the context of a four peer network for the sake of simplicity, embodiments of the present invention may provide improvements that may be accentuated when applied in the context of even larger networks. Thus, FIG. 4 should be appreciated as being merely exemplary and not limiting with respect to the number of nodes included therein.

For a typical updating of a user entry, which will now be described in reference to FIG. 4, the user may utilize the user entry manager 78 to identify, for example, contact information and/or files, data or content to be designated as a resource for sharing via the DHT network. Accordingly, the user may utilize the user entry manager 78 to update the user entry in DHT. As indicated in FIG. 4, the first peer 80 may include or embed the identified resource (e.g., the contact information and/or files, data or content to be shared) in a PUT request 88, which may be addressed to a user ID (which may be equivalent to a data ID in a conventional DHT network). The PUT request 88 may then be sent to another peer (e.g., the second peer 82), for example, according to a routing algorithm. The PUT request 88 may then be forwarded to another peer (e.g., the third peer 84) that may be responsible for storing the corresponding user entry as indicated by forwarded PUT request 90. Of note, although only one forwarded PUT request is shown herein for the sake of simplicity, numerous forwards could be utilized in some networks. The third peer 84 may then update the corresponding user entry by storing the user entry (e.g., the information or content embedded in the PUT request 88) in response to receipt of the forwarded PUT request 90. The third peer 84 may send a response 92 to the first peer 80 to indicate confirmation and/or successful updating of the user entry. The response 92 may follow the reverse path that the PUT request 88 followed in transit to the third peer 84. In other words, the response 92 may be forwarded by the second peer 82 to the first peer 80 as indicated by forwarded response 94. The response 92 may also employ the same, or a similar, routing algorithm as was used by first peer 80 resulting in a non-identical, route back to the first peer 80 through the DHT.

When a peer or node of the network retrieves a user entry from the DHT, the peer may utilize similar message flow patterns as described above except that data would be transferred in the opposite direction (e.g., in response to a GET request). Transferring data through intermediate peers or nodes increases the load on P2P networks, which may be problematic or introduce challenges in mobile P2P networks due to the limited resources (e.g., CPU, memory, bandwidth, battery life, etc.) associated with mobile devices. Additionally, the probability that data will reach its destination reduces when PUT/GET messages carry large amounts of data due to forwarding and the distributed nature of DHT networks in mobile environments. According to an exemplary embodiment of the present invention, each of the peers in the P2P network may maintain a connection to other peers in its neighbor list during normal operation. The peer(s) may pick its neighbors according to a specific structure based on a network topology. This structure need not require the peer(s) to pick the neighbors that are the closest to it. When one or more resources of the peer device such as first peer 80 in this example (which may be either apparatus 7 or mobile terminal 10) becomes limited due to processor constraints, memory constraints, battery loss, bandwidth etc., the first peer 80 may change its status to a client mode of operation. When the status of the peer device is changed, the DHT is also updated to reflect the status of this change.

It should be pointed out that when the first peer 80 changes its status to the client mode it still maintains a connection to one or more neighbor nodes (e.g., second peer 82 and fourth peer 86) and the first peer 80 sends an indication to the neighbor nodes (i.e., peers) that it is now operating as a client. The peer (e.g., first peer 80) may maintain the connection with one or more peers by, for example, sending keepalive messages to them periodically. However the peer operating in the client mode (e.g., first peer 80) may decide to keep a connection to a small subset of neighboring peers and keep pointers to the rest of the neighboring peers. In other words, after a peer transitions to a client mode, it may keep a connection with one or more of the neighbor peers, i.e., the peers that were its neighbor when it was operating in a peer mode. In an exemplary alternative embodiment a client may drop connections to some of the neighbor peers and keep a connection to only some or one neighbor peer in order to save bandwidth in the P2P network and conserve battery power of the devices (apparatus 7 and/or mobile terminal 10) in the P2P network.

The one or more peers to which a client (e.g., first peer 80) is connected can inform the client about the addresses (e.g. IP addresses) of its neighbors, so if the client wants to transition to the peer mode again, it may connect to the peers using the received address information without searching for them. This may lessen the load on the DHT since the peer seeking to transition from a client mode to a peer mode and vice versa in the P2P network may not need to rely on the DHT to determine the addresses of neighboring peers. In another alternative exemplary embodiment, a peer operating in a client mode may maintain connections to all of its neighboring peers. This makes the transition of the peer operating in the client mode back to the peer mode faster but may consume more resources (e.g., battery power, bandwidth, processor constraints, etc.) in the P2P network.

Since the first peer 80 was responsible for sharing a resource such as contact information and/or files as noted above, while it was operating in a peer mode, the first peer 80 operating in the client mode may transfer the data to its neighbor nodes (second peer 82 and fourth peer 86) which may store the data in a memory such as memory 76. Alternatively, if the first peer 80 is capable of utilizing a replication mechanism, the first peer 80 while operating in the client mode is not required to transfer the resource for sharing (e.g., contact information and/or files). For instance, if the first peer 80 for example while operating in the client mode utilizes a replication software application, the first peer 80 can copy or replicate the resource for sharing with the respective neighbor nodes. It should be pointed out however that if the P2P overlay network uses a replication mechanism then data may be replicated when a device is operating as a peer or a client. In this regard, transition of status of the device may not impact replication because it may occur before the transition. For instance, there may be some instances in which replication is desired by the nodes in the P2P network after a transition but this is an option for the nodes in the P2P network.

Once the first peer 80 (for example) operating in the client mode ensures that the shared resource is stored at one or more neighbor nodes, the first peer 80 may inform the neighbor nodes that it is no longer answering any queries for a shared resource(s) from other peers and informs the neighbor nodes that at least one of the neighbor nodes has to answer the queries for the shared resource by other peers (e.g., second peer 82) instead.

Each of the peers 80, 82, 84 and 86 may contain rules stored in memory specifying that a transition of a peer to/from a client mode to/from a peer mode cannot be performed when the DHT is in a transition state, for example when shared resources are being transferred from a peer other than first peer 80 to another peer such as, from the second peer 82 to third peer 84. In this regard, the neighbor nodes will not accept a peer to a client transition request or a client to a peer transition request when the DHT is in transition. In this situation, a peer may try to perform the transition from a peer to a client mode or from the client mode back to the peer mode after a specified time period (e.g., 30 seconds). In other words, the peer seeking to transition to a different mode may need to get permission from its neighbor nodes that it may perform the transition. Once the permission is granted by one or more neighbor nodes, the peer e.g., first peer 80 may perform the transition (in this e.g., from client mode to peer mode) and the DHT is updated accordingly.

A benefit of causing the first peer 80 to wait a predetermined time after the DHT is in a transition state before switching back to a peer mode (or vice versa a client mode) is that it decreases the impact of the changes to the DHT at a given time with changes to the DHT otherwise serving to increase the load balance, bandwidth and data retrieval mechanisms of the P2P network. It should be pointed out however that in some situations the peers may contain rules which allow the denial of a transition request by one or more neighbor nodes to be overruled or ignored. In this regard, the peer device seeking to perform a transition to/from client or peer modes may perform the transition even when one or more neighbor nodes did not approve of the transition.

If the first peer 80 operating in the client mode wants to turn back to the peer mode (e.g., when a battery of the first peer 80 becomes recharged) it informs the peers to which it is connected i.e., the neighbor nodes (e.g., second peer 82 and fourth peer 86) that it is about to switch to the peer mode. After switching to the peer mode, the first peer 80 may update its routing table, if it is outdated, by receiving an update from one of its neighbor nodes. Alternatively, the first peer 80 for example, may utilize a routing algorithm to update its routing table. Additionally or alternatively, the first peer 80 may listen to messages that are sent to it in route to other peers to update its routing table.

Accordingly, embodiments of the present invention may provide a mechanism to reduce the cost of maintaining the DHT in terms of network load, data storage retrieval, etc. by fostering a protocol interaction that allows for a simplified transition to/from a peer mode to a client mode of a peer device with less impact to the DHT when the transition occurs.

Figure 5:
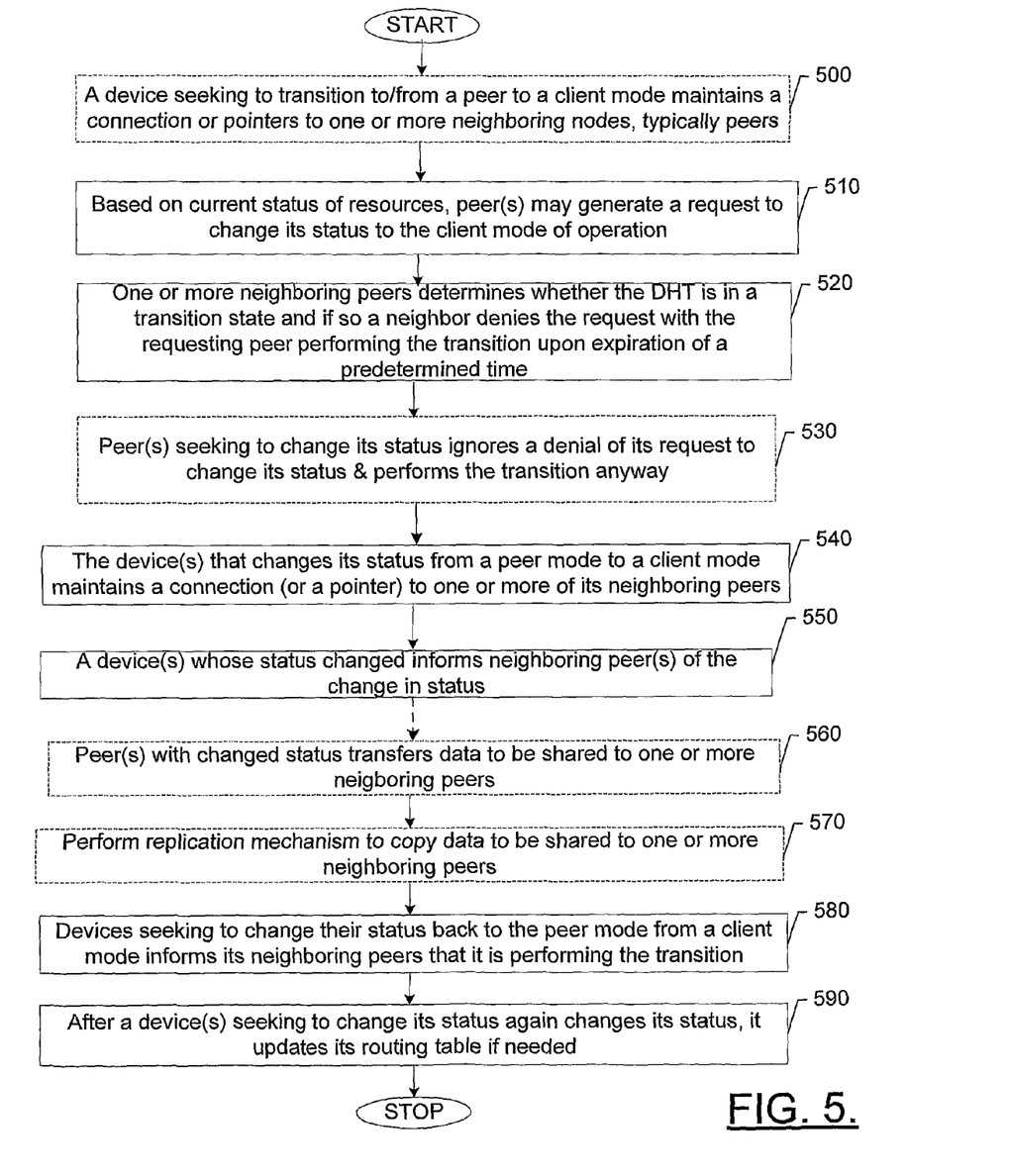
FIG. 5 is a flowchart according to an exemplary method of transitioning a peer device to/from a client device functionality as well as to a server device functionality in a P2P network according to one embodiment of the present invention.

FIG. 5 is a flowchart of a method and program product for transitioning a peer device to/from a client device functionality as well as to a server device functionality in a P2P network according to exemplary embodiments of the present invention. Optionally, at operation 500, a peer (e.g., first peer 80) maintains a connection or a pointer(s) to one or more other peers such as its neighboring peers. At operation 510, when a peer determines that its resources (e.g., battery power, memory, processor constraints, etc.) are limited or alternatively that resources in the P2P network (e.g., bandwidth, excessive traffic in the P2P network) are limited, the peer may generate a request to change its status to a client mode. This request may be sent to its neighboring nodes. For instance, when the peer determines that its battery power is below a certain threshold (e.g., below 10% of the remaining battery power) the peer may generate a request to change its status from a peer mode to a client mode. At operation 520, one or more of the neighboring peers determines whether the DHT is in a transition state (e.g., the DHT is in transition due to exchange of data between one or more other peers) and if so one or more of the peers may deny the request of the peer seeking to change its status to a client mode (or a peer mode). In this regard, the peer may change its status after the expiration of a predetermined time (e.g., 30 seconds). Otherwise, the neighboring peers that receive the request grant the peer request to change its status. Optionally, at operation 530, the peer that is seeking to change its status may ignore a denial of its request to change its status by one or more of its neighboring peers and change its status anyway without resorting to waiting for the expiration of any time period. As described above, this may be based on a set of rules defined in the peer. These rules may be pre-stored in memories of the peers or provided to the peers by a server such as origin server 54.

At operation 540, when a peer(s) changes its status from a peer mode to a client mode (or from a client mode to a peer mode) of operation, the peer that changes its status still keeps a connection or a pointer(s) to one or more of its neighbor peers. As noted above, the peer that changes its status may maintain a connection to only one neighboring peer. Alternatively, the peer that changes its status may maintain a connection to some of the neighboring peers or all of the neighboring peers. In instances in which the peer that changes its status maintains a connection to all of its neighboring peers the transition from a peer mode to a client mode (or from a client mode to peer mode) may occur faster. However, more resources (e.g., battery and bandwidth, etc.) are consumed in the P2P network by maintaining a connection to all of the neighboring peers.

At operation 550, the peer that changed its status (e.g., switched between the client mode or the peer mode) may inform the neighboring peer(s) to which it is connected that it (i.e., the peer that changed its status) is operating in the client mode or the peer mode. Optionally, at operation 560, if the peer that changed its status to a client mode is responsible for sharing data (e.g., image, video, audio, etc.) with other peers when it was operating in a peer mode, it may transfer the data that was to be shared to one or more of its neighbor peers. Optionally, at operation 570, the peer that changed its status from peer mode to client mode may perform a replication mechanism such as by executing a replication application which copies the data to be shared to one or more of the neighboring peers. The replication application may be executed by a processor such as for example controller 20 and/or processing element 70. If the peer with the changed status performs the replication mechanism, it does not need to transfer the data to its neighbor peers, since it copies the data to the neighboring peer(s). Instead, the peer with the changed status (e.g., the peer operating in the client mode) may inform its neighbors that it is no longer answering queries for the data to be shared from other peers and instructs one or more of the neighboring peers to answer the queries and send the corresponding data to be shared instead.

At operation 580, if the peer that changed its status wants to transition again to another mode or operation (i.e., client/peer mode), it may inform the neighboring peers to which it is connected that it (i.e., the peer that changed its status) is transitioning to the peer mode (or alternatively the client mode). At operation 590, after transitioning from a peer mode (or alternatively client mode), the peer that changed its status updates its routing table, if the routing table is outdated. Updating of the routing table may be performed by receiving an update from one or more neighboring peers.

It should be understood that each block or step of the flowchart, shown in FIG. 5 and combination of blocks in the flowchart, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus (e.g., hardware) means for implementing the functions implemented specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the functions specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions that are carried out in the system.

The above described functions may be carried out in many ways. For example, any suitable means for carrying out each of the functions described above may be employed to carry out the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
identifying resources of an originating node;
communicating, from the originating node, information to at least another node, the information comprising a request to change a mode of operation of the originating node from a peer mode of operation to a client mode of operation based on the identified resources;
maintaining a connection to one or more neighbor nodes after changing from the peer mode to the client mode; and
receiving, in response to the communicated information, data specifying whether a distributed hash table is in a transition state,
wherein the peer mode of operation includes a maintenance of a peer-to-peer overlay network, and wherein the client mode of operation inhibits at least the maintenance of the peer-to-peer overlay network.

2. The method of claim 1, wherein the communicating comprises sending the request to the at least another node in response to determining that the identified resources are at least one of equal to and below a predetermined threshold.

3. The method of claim 1, wherein in the peer and the client modes of operation the originating node is configured to receive one or more requests for data from one or more other nodes and send the requested data to a requesting node or an intermediate node that is configured to forward the data to the requesting node, and
wherein the originating node is configured to maintain an overlay network only in the client mode of operation.

4. The method of claim 1, wherein the transition state occurs in response to an exchange of content between first and second nodes among a plurality of nodes, and
wherein the data comprises a denial of the request when the distributed hash table is in the transition state.

5. The method of claim 4, further comprising:
automatically changing the peer mode to the client mode of operation after a predetermined time.

6. The method of claim 1, wherein the transition state occurs in response to an exchange of data between first and second nodes among a plurality of nodes, and
wherein the data comprises a grant of the request when the distributed hash table is not in the transition state.

7. The method of claim 6, further comprising:
changing the peer mode to the client mode of operation, in response to the grant.

8. The method of claim 7, further comprising:
replicating data by copying the data to one or more neighboring nodes which forwards the replicated data to a requesting node if the originating node was previously responsible for sharing data with the requesting node while it was operating in the peer mode.

9. The method of claim 7, further comprising:
evaluating the resources and determining to change the client mode of operation to the peer mode of operation based on the evaluated resources;
informing the neighbor nodes of the change; and
updating a routing table, if the routing table does not contain current route information, upon receipt of an update from at least one of the neighbor nodes.

10. An apparatus comprising:
at least one processor; and
at least one memory including computer program code, the at least one processor, the at least one memory, and the computer program code configured to cause the apparatus to at least:
identify resources of the apparatus;
communicate, from the apparatus, information to at least one node, the information comprising a request to change a mode of operation of the apparatus from a peer mode of operation to a client mode of operation based on the identified resources;
maintain a connection to one or more neighbor nodes after changing from the peer mode to the client mode; and
receive, in response to the communicated information, data specifying whether a distributed hash table is in a transition state,
wherein the peer mode of operation includes a maintenance of a peer-to-peer overlay network, and wherein the client mode of operation inhibits at least the maintenance of the peer-to-peer overlay network.

11. The apparatus of claim 10, wherein the processor is configured to communicate the information by sending the request to the at least one node in response to determining that the identified resources are at least one of equal to and below a predetermined threshold.

12. The apparatus of claim 10, wherein in the peer and the client modes of operation the apparatus is configured to receive one or more requests for data from one or more other nodes and send the requested data to a requesting node or an intermediate node that is configured to forward the data to the requesting node, and
wherein the apparatus is configured to maintain an overlay network only in the client mode of operation.

13. The apparatus of claim 10, wherein the transition state occurs in response to an exchange of content between peer and client nodes among a plurality of nodes, and
wherein the data comprises a denial of the request when the distributed hash table is in the transition state.

14. The apparatus of claim 13, wherein the processor is further configured to automatically change the peer mode to the client mode of operation after a predetermined time.

15. The apparatus of claim 10, wherein the transition state occurs in response to an exchange of data between first and second nodes among a plurality of nodes, and
wherein the data comprises a grant of the request when the distributed hash table is not in the transition state.

16. The apparatus of claim 15, wherein the processor is further configured to change the peer mode to the client mode of operation, in response to the grant.

17. The apparatus of claim 16, wherein the processor is further configured to replicate data by copying the data to one or more neighboring nodes, each of the neighbor nodes configured to forward the replicated data to a requesting node if the apparatus was previously responsible for sharing data with the requesting node while it was operating in the peer mode.

18. The apparatus of claim 16, wherein the processor is further configured to:
evaluate the resources and change the client mode of operation to the peer mode of operation based on the evaluated resources;
inform the neighbor nodes of the change; and
update a routing table, if the routing table does not contain current route information, upon receipt of an update from at least one of the neighbor nodes.

19. A computer program product comprising at least one non-transitory computer-readable storage medium encoded with instructions that, when executed by at least one processor, perform at least the following:
identifying resources of an originating node;
communicating, from the originating node, information to at least one node, the information comprising a request to change a mode of operation of the originating node from a peer mode of operation to a client mode of operation based on the identified resources;
maintaining a connection to one or more neighbor nodes after changing from the peer mode to the client mode; and
receiving, in response to communicated information, data specifying whether a distributed hash table is in a transition state,
wherein the peer mode of operation includes a maintenance of a peer-to-peer overlay network, and wherein the client mode of operation inhibits at least the maintenance of the peer-to-peer overlay network.

20. An apparatus comprising:
at least one processor; and
at least one memory including computer program code, the at least one processor, the at least one memory, and the computer program code configured to cause the apparatus to at least:
receive a request from an originating node to change a mode of operation of the originating node from a peer mode of operation to a client mode of operation based on identified resources of the originating node;
determine whether a distributed hash table is in a transition state; and
send, in response the request, the originating node information indicating whether the originating node is allowed to change from the peer mode to the client mode based on the determined transition state, the originating node maintaining a connection to one or more neighbor nodes after changing from the peer mode to the client mode,
wherein the peer mode of operation includes a maintenance of a peer-to-peer overlay network, and wherein the client mode of operation inhibits at least the maintenance of the peer-to-peer overlay network.

* * * * *